United States Patent
Henry et al.

(10) Patent No.: US 11,962,761 B2
(45) Date of Patent: Apr. 16, 2024

(54) METHODS AND DEVICES FOR ENCODING AND DECODING A DATA STREAM REPRESENTING AT LEAST ONE IMAGE THAT DISABLES POST-PROCESSING OF RECONSTRUCTED BLOCK BASED ON PREDICTION MODE

(71) Applicant: ORANGE, Issy-les-Moulineaux (FR)

(72) Inventors: Félix Henry, Chatillon (FR); Mohsen Abdoli, Chatillon (FR); Gordon Clare, Chatillon (FR); Pierrick Philippe, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 35 days.

(21) Appl. No.: 17/973,966

(22) Filed: Oct. 26, 2022

(65) Prior Publication Data

US 2023/0050410 A1 Feb. 16, 2023

Related U.S. Application Data

(62) Division of application No. 17/277,945, filed as application No. PCT/FR2019/052029 on Sep. 3, 2019, now Pat. No. 11,516,465.

(30) Foreign Application Priority Data

Sep. 21, 2018 (FR) ...................................... 1858573

(51) Int. Cl.
*H04N 19/105* (2014.01)
*H04N 19/117* (2014.01)
(Continued)

(52) U.S. Cl.
CPC ......... *H04N 19/105* (2014.11); *H04N 19/117* (2014.11); *H04N 19/159* (2014.11);
(Continued)

(58) Field of Classification Search
CPC .. H04N 19/105; H04N 19/117; H04N 19/159; H04N 19/176; H04N 19/80;
(Continued)

(56) References Cited

U.S. PATENT DOCUMENTS 9,253,508 B2 2/2016 Gao et al.
2012/0287994 A1* 11/2012 Van der Auwera .. H04N 19/176
375/E7.243
(Continued)

OTHER PUBLICATIONS

International Search Report dated Dec. 12, 2019 for corresponding International Application No. PCT/FR2019/052029, Sep. 3, 2019.
(Continued)

*Primary Examiner* — Francis Geroleo
(74) *Attorney, Agent, or Firm* — David D. Brush; Westman, Champlin & Koehler, P.A.

(57) ABSTRACT

A method for decoding a data stream representative of an image split into blocks. For a current block of the image, an item of information indicating a coding mode among a first and a second coding mode of the current block is decoded from the data stream and the current block is decoded depending on this information. When the coding mode of the current block corresponds to the second coding mode, the current block is reconstructed from a prediction obtained, for each pixel, from another previously decoded pixel belonging to the current block or to a previously decoded block of the image, and from a decoded residue associated with the pixel. At least one processing method is applied to the reconstructed current block for at least one pixel of the current block depending on the coding mode of the current block and/or the coding mode of the neighbouring blocks.

18 Claims, 4 Drawing Sheets

Figure 1:
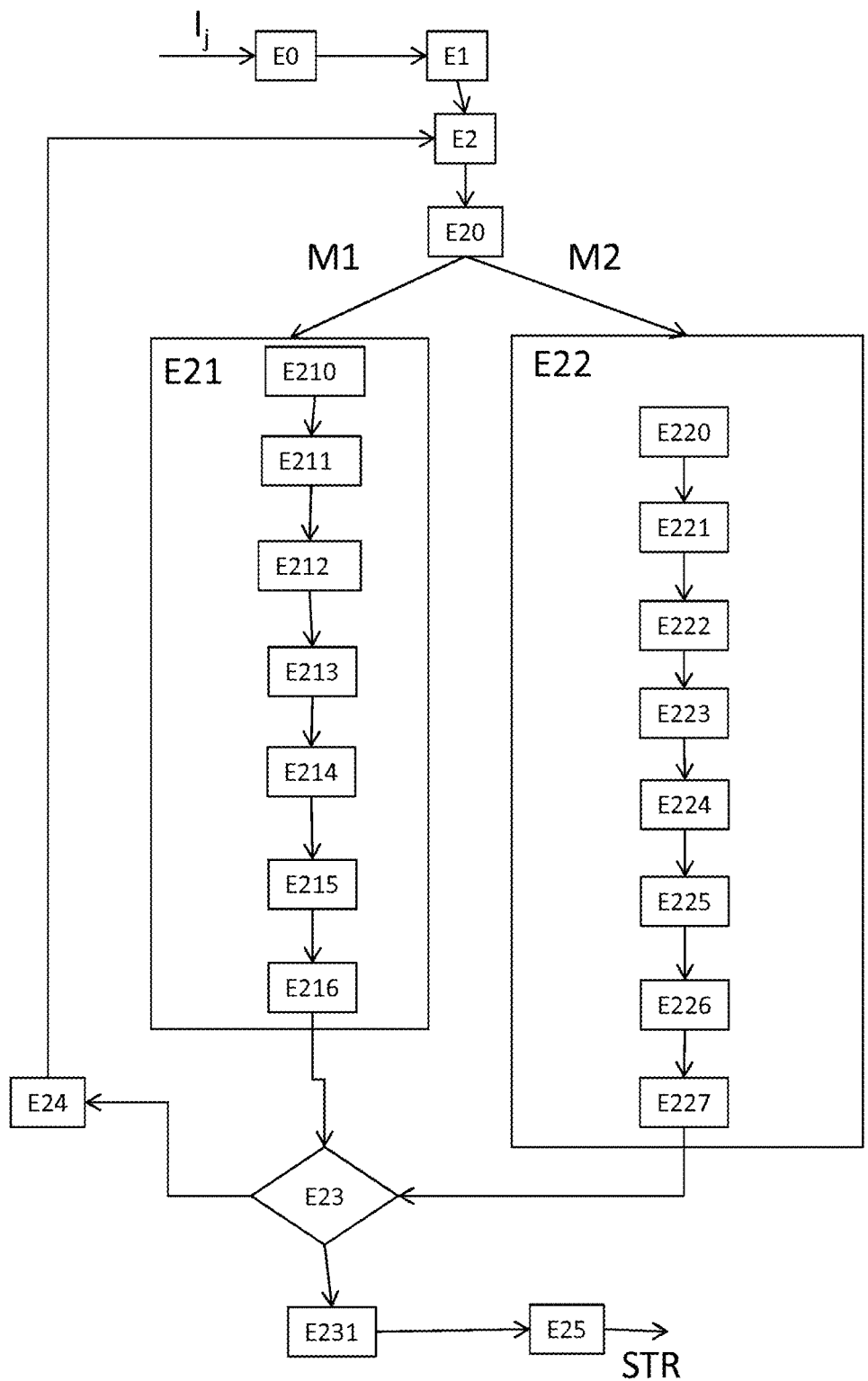

(51) Int. Cl.
*H04N 19/159* (2014.01)
*H04N 19/176* (2014.01)
*H04N 19/80* (2014.01)
*H04N 19/85* (2014.01)

(52) U.S. Cl.
CPC ........... *H04N 19/176* (2014.11); *H04N 19/80* (2014.11); *H04N 19/85* (2014.11)

(58) Field of Classification Search
CPC ........ H04N 19/85; H04N 19/86; H04N 19/11; H04N 19/593
See application file for complete search history.

(56) References Cited

U.S. PATENT DOCUMENTS

| | | | | |
|---|---|---|---|---|
| 2013/0101025 | A1* | 4/2013 | Van der Auwera .. | H04N 19/593 375/240.03 |
| 2015/0365695 | A1* | 12/2015 | Pu ........................ | H04N 19/117 375/240.16 |
| 2016/0241868 | A1* | 8/2016 | Li .......................... | H04N 19/57 |
| 2017/0127090 | A1* | 5/2017 | Rosewarne ............ | H04N 19/86 |
| 2019/0028710 | A1* | 1/2019 | Fu ........................ | H04N 19/146 |

OTHER PUBLICATIONS

Written Opinion of the International Searching Authority dated Dec. 12, 2019 for corresponding International Application No. PCT/FR2019/052029, filed Sep. 3, 2019.
Abdoli Mohsen et al. "Intra prediction using in-loop residual coding for the post-HEVC standard" 2017 IEEE 19th International Workshop on Multimedia Signal Processing (MMSP), IEEE, Oct. 16, 2017 (Oct. 16, 2017), pp. 1-6, DOI: 10.1109/MMSP.2017.8122241, XP033271573.
Matthias Wien, "High Efficiency Video Coding, Coding Tools and Specification", Signals and Communication Technology, 2015.
Andrey Norkin et al., "HEVC Deblocking Filter", IEEE Transactions on Circuits and Systems for Video Technology (vol. 22, Issue: 12, Dec. 2012), pp. 1746-1754.
Chih-Ming Fu et al., "Sample Adaptive Offset in the HEVC Standard", IEEE Transactions on Circuits and Systems for Video Technology, vol. 22, No. 12, Dec. 2012, pp. 1755-1764.
English translation of the Written Opinion of the International Searching Authority dated Dec. 20, 2019 for corresponding International Application No. PCT/FR2019/052029, filed Sep. 3, 2019.
Notice of Allowance and Fee(s) Due for U.S. Appl. No. 17/277,945, dated Aug. 17, 2022, 5 pages.
Non-Final Rejection for U.S. Appl. No. 17/277,945, dated Apr. 1, 2022, 9 pages.

* cited by examiner

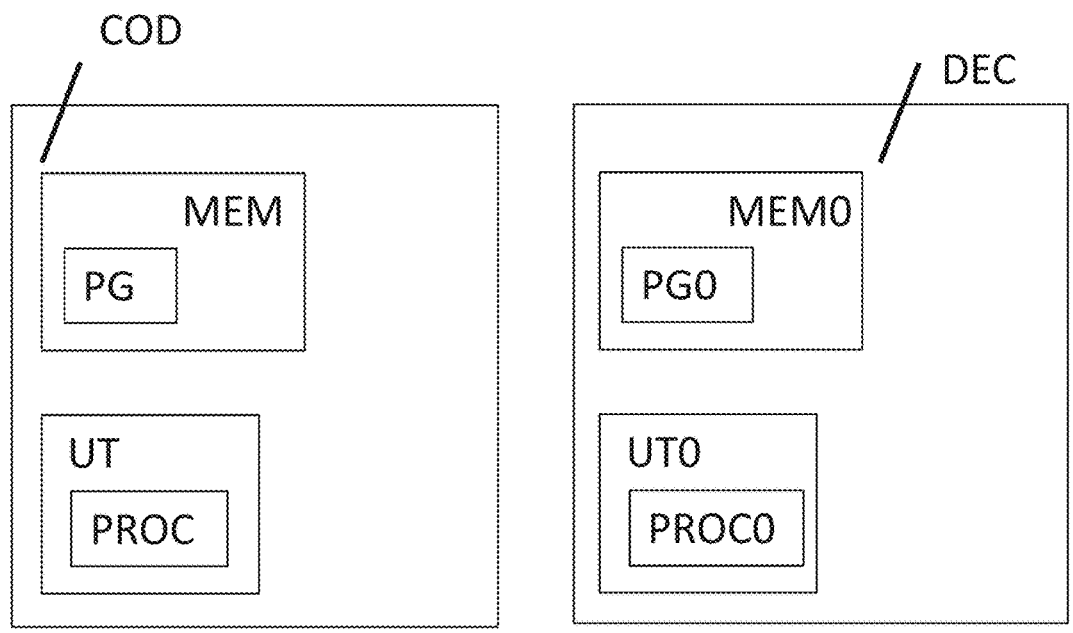
Fig. 6
Fig. 7
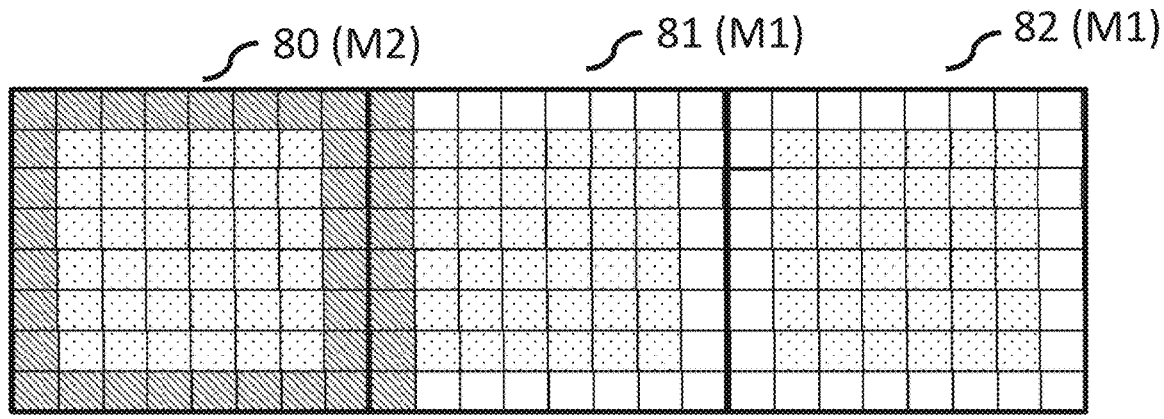
Fig. 5A
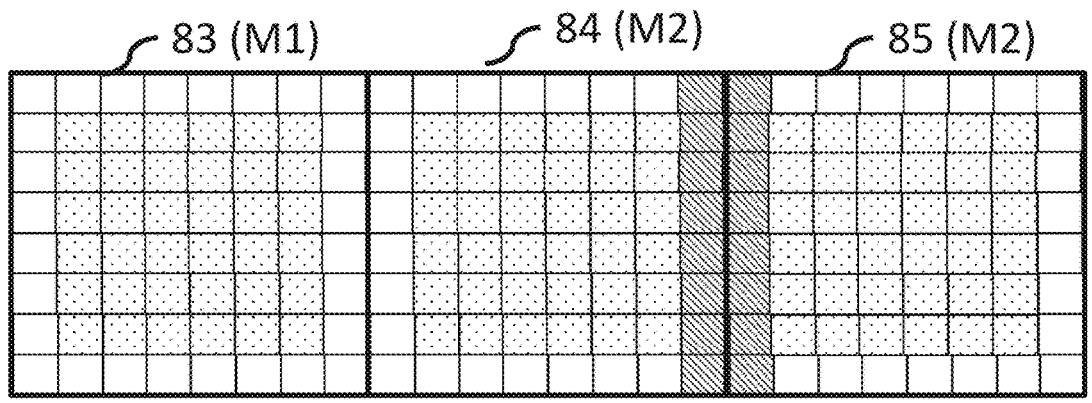
Fig. 5B

METHODS AND DEVICES FOR ENCODING AND DECODING A DATA STREAM REPRESENTING AT LEAST ONE IMAGE THAT DISABLES POST-PROCESSING OF RECONSTRUCTED BLOCK BASED ON PREDICTION MODE

CROSS-REFERENCE TO RELATED APPLICATIONS

This Application is a divisional of U.S. application Ser. No. 17/277,945, filed Mar. 19, 2021, which is a Section 371 National Stage Application of International Application No. PCT/FR2019/052029, filed Sep. 3, 2019, and published as WO 2020/058595 A1 on Mar. 26, 2020, not in English, the contents of which are incorporated by reference in their entireties.

FIELD OF THE INVENTION

The field of the invention is that of encoding and decoding images or sequences of images, and in particular video streams.

More specifically, the invention relates to the compression of images or sequences of images using a block representation of the images.

The invention can notably be applied to the image or video coding implemented in the current or future encoders (JPEG, MPEG, H.264, HEVC, etc. and their amendments), and to the corresponding decoding.

PRIOR ART

Digital images and sequences of images take up a lot of space in terms of memory, which requires, when transmitting these images, to compress them in order to avoid congestion problems on the network used for this transmission.

Many techniques for compressing video data are already known. Among these, the HEVC compression standard ("High Efficiency Video Coding, Coding Tools and Specification", Matthias Wien, Signals and Communication Technology, 2015) proposes to implement a prediction of pixels of a current image in relation to other pixels belonging to the same image (intra prediction) or to a previous or subsequent image (inter prediction).

More specifically, the intra prediction uses the spatial redundancies within an image. To do this, the images are split into blocks of pixels. The blocks of pixels are then predicted using already reconstructed information, corresponding to the previously coded/decoded blocks in the current image according to the scanning order of the blocks in the image.

Furthermore, in a standard manner, the coding of a current block is carried out using a prediction of the current block, referred to as the predictor block, and a prediction residue or "residual block", corresponding to a difference between the current block and the predictor block. The resulting residual block is then transformed, for example using a DCT (discrete cosine transform) type transform. The coefficients of the transformed residual block are then quantized, coded by entropy coding and transmitted to the decoder, that can reconstruct the current block by adding this residual block to the predictor block.

The decoding is done image by image, and for each image, block by block. For each block, the corresponding elements of the stream are read. The inverse quantization and the inverse transform of the coefficients of the residual block are performed. Then, the block prediction is calculated to obtain the predictor block, and the current block is reconstructed by adding the prediction (i.e. the predictor block) to the decoded residual block.

In U.S. Pat. No. 9,253,508, a DPCM (Differential Pulse Code Modulation) coding technique for coding blocks in intra mode is integrated into an HEVC encoder. Such a technique consists in predicting a set of pixels of an intra block by another set of pixels of the same block that have been previously reconstructed. In U.S. Pat. No. 9,253,508, a set of pixels of the intra block to be coded corresponds to a row of the block, or a column, or a row and a column, and the intra prediction used to predict the set of pixels is one of the directional intra predictions defined in the HEVC standard.

However, such a technique is not optimal. Indeed, the reconstruction of a set of pixels of the intra block corresponds either to the addition of a prediction residue in the case of a lossless coding, thus offering a fairly low compression ratio, or to the addition of a prediction residue after inverse transform and/or inverse quantization of said other set of pixels serving as a prediction. Such a technique thus does not enable each pixel of the intra block to be predicted using a local prediction function and the predicted pixel to be reconstructed before a subsequent pixel is predicted. Indeed, this technique requires a set of pixels (row/column of the block for example) to be reconstructed to predict another set of pixels. In other words, with each prediction and reconstruction of a part of the block, several pixels of the block are predicted and reconstructed.

Moreover, in U.S. Pat. No. 9,253,508, it is not described how to make conventional intra prediction modes as defined in the HEVC standard for example and the DPCM prediction mode coexist.

There is therefore a need for a new coding and decoding method to improve the compression of image or video data.

SUMMARY OF THE INVENTION

The invention improves the state of the art. For this purpose, it relates to a method for decoding a coded data stream representative of at least one image that is split into blocks. Such a decoding method comprises, for at least one block of the image, referred to as the current block:

decoding an item of information indicating a coding mode of the current block among at least a first coding mode and a second coding mode, the second coding mode being a coding mode according to which the current block is decoded by, for each pixel of the current block:

obtaining a prediction of said pixel from another previously decoded pixel, said other previously decoded pixel belonging to said current block or to a previously decoded block of the image, decoding a prediction residue associated with said pixel, reconstructing said pixel from the prediction of said pixel obtained and the decoded prediction residue associated with said pixel, decoding the current block according to the coding mode indicated by the decoded item of information, when the coding mode of the current block corresponds to a coding mode distinct from the second coding mode, applying at least one processing method to the reconstructed current block, when the coding mode of the current block corresponds to the second coding mode, disabling the application of said at least one processing method to the reconstructed current block for at least one pixel of said current block.

Thus, according to the invention, the application of processing operations on a reconstructed block is not performed in the case of a block decoded according to a coding mode using a pixel prediction from previously reconstructed pixels of the same block. According to this coding mode, the prediction residue associated with each pixel is not transformed. The processing methods aim to improve the quality of the reconstructed blocks of pixels, for example by reducing the effects of discontinuities between blocks due to the prediction residue coding with a transform (deblocking filter), or by correcting the individual value of each pixel (also known as Sample Adaptive Offset or SAO).

According to the invention, the second coding mode does not use a prediction residue transform since the prediction residue associated with each pixel must be available immediately for the pixel reconstruction and so it can be used to predict the subsequent pixels of the current block. Thus, when the current block is decoded according to the second coding mode, it is not necessary to reduce discontinuities at the boundaries of this current block. Similarly, when the current block is decoded using the second coding mode, the value of each pixel is coded individually using a prediction residue associated with each pixel. It is therefore not necessary to correct the value of each pixel.

The processing methods applied to the reconstructed blocks usually require the transmission of parameters at block level. Disabling these processing methods for the blocks coded according to the second coding mode thus enables a gain in rate. Moreover, the decoding process can be substantially accelerated since these processing methods are not applied for these blocks.

The invention also relates to a method for encoding a data stream representative of at least one image that is split into blocks. Such a coding method comprises, for at least one block of the image, referred to as the current block:
   coding an item of information indicating a coding mode of the current block among at least a first coding mode and a second coding mode, the second coding mode being a coding mode according to which the current block is coded by, for each pixel of the current block:
      obtaining a prediction of said pixel from another previously decoded pixel, said other previously decoded pixel belonging to said current block or to a previously decoded block of the image,
      coding a prediction residue associated with said pixel obtained from the prediction of said pixel,
      reconstructing said pixel from the decoded prediction residue associated with said pixel and the prediction of said pixel,
   coding the current block according to the coding mode indicated by the coded item of information,
   when the coding mode of the current block corresponds to a coding mode distinct from the second coding mode, applying at least one processing method to the reconstructed current block,
   when the coding mode of the current block corresponds to the second coding mode, disabling the application of said at least one processing method to the reconstructed current block for at least one pixel of said current block.

According to a particular embodiment of the invention, the processing method is a deblocking filtering applied to the pixels of the reconstructed current block that are located at the boundary of the reconstructed current block with a reconstructed neighbouring block in the image. According to this particular embodiment of the invention, the processing method corresponds to a "deblocking" filter conventionally applied at block boundaries to reduce the effects of discontinuities between blocks.

According to a particular embodiment of the invention:
   when the current block is decoded or coded according to the second coding mode:
      the application of the deblocking filtering to the reconstructed current block is disabled for all the pixels of the reconstructed current block,
   when the current block is decoded or coded according to a coding mode distinct from the second coding mode:
      the deblocking filtering is applied to a pixel of the reconstructed current block if said pixel is located on a boundary of said reconstructed current block with a neighbouring reconstructed block in the image and if said neighbouring block is decoded or coded according to a coding mode distinct from the second coding mode.

According to this particular embodiment of the invention, the deblocking filtering is only applied to the pixels at the boundary of two blocks that are both coded or decoded according to coding modes distinct from the second coding mode. In other words, for a current block coded or decoded according to a coding mode distinct from the second coding mode, the deblocking filtering is disabled for the pixels of the reconstructed current block that are located on the boundary with a neighbouring block coded or decoded according to the second coding mode.

According to another particular embodiment of the invention, when the current block is decoded or coded according to the second coding mode:
   the application of the deblocking filtering to the reconstructed current block is disabled for a pixel of the reconstructed current block if said pixel is located on a boundary of said reconstructed current block with a neighbouring block in the image and if said neighbouring block is decoded or coded according to the second coding mode, and
   the deblocking filtering is applied to a pixel of the reconstructed current block if said pixel is located on a boundary of said reconstructed current block with a reconstructed neighbouring block in the image and if said neighbouring block is decoded or coded according to a coding mode distinct from the second coding mode.

According to this other particular embodiment of the invention, the deblocking filtering is applied to the pixels located at the boundary of two blocks of which at least one of the blocks is coded or decoded according to a coding mode distinct from the second coding mode.

However, the deblocking filtering is disabled for the pixels located at the boundary of two blocks that are both coded or decoded according to the second coding mode.

This particular embodiment of the invention smooths the block effects for the blocks coded or decoded according to the first coding mode or any other coding mode distinct from the second coding mode, even when these are neighbours of a reconstructed block that was coded or decoded according to the second coding mode.

According to another particular embodiment of the invention, the processing method is a method for correcting at least one pixel of the reconstructed current block by adding to the reconstructed value of said pixel a value obtained from an item of information coded in the data stream or decoded from the data stream. According to this particular embodiment of the invention, the processing method corresponds to the SAO method that has been integrated to the HEVC compression standard.

According to a particular embodiment of the invention, when the current block is decoded or coded according to the second coding mode, the application of said correction method to the reconstructed current block is disabled for all the pixels of the reconstructed current block.

The invention also relates to a decoding device configured to implement the decoding method according to any one of the particular embodiments defined above. This decoding device could, of course, comprise the different characteristics relating to the decoding method according to the invention. Thus, the characteristics and advantages of this decoding device are the same as those of the decoding method, and they are not detailed further.

The decoding device comprises in particular a processor configured, for at least one block of the image, referred to as the current block, to:
- decode an item of information indicating a coding mode of the current block among at least a first coding mode and a second coding mode, the second coding mode being a coding mode according to which the current block is decoded by, for each pixel of the current block:
  - obtaining a prediction of said pixel from another previously decoded pixel, said other previously decoded pixel belonging to said current block or to a previously decoded block of the image,
  - decoding a prediction residue associated with said pixel,
  - reconstructing said pixel from the prediction of said pixel obtained and the decoded prediction residue associated with said pixel,
- decode the current block according to the coding mode indicated by the decoded item of information,
- when the coding mode of the current block corresponds to a coding mode distinct from the second coding mode, apply at least one processing method to the reconstructed current block,
- when the coding mode of the current block corresponds to the second coding mode, disable the application of said at least one processing method to the reconstructed current block for at least one pixel of said current block.

According to a particular embodiment of the invention, such a decoding device is comprised in a terminal.

The invention also relates to an encoding device configured to implement the encoding method according to any one of the particular embodiments defined above. This encoding device could, of course, comprise the different characteristics relating to the coding method according to the invention. Thus, the characteristics and advantages of this encoding device are the same as those of the encoding method, and they are not detailed further.

The encoding device comprises in particular a processor configured, for at least one block of the image, referred to as the current block, to:
- code an item of information indicating a coding mode of the current block among at least a first coding mode and a second coding mode, the second coding mode being a coding mode according to which the current block is coded by, for each pixel of the current block:
  - obtaining a prediction of said pixel from another previously decoded pixel, said other previously decoded pixel belonging to said current block or to a previously decoded block of the image,
  - coding a prediction residue associated with said pixel obtained from the prediction of said pixel,
  - reconstructing said pixel from the decoded prediction residue associated with said pixel and the prediction of said pixel,
- code the current block according to the coding mode indicated by the coded item of information,
- when the coding mode of the current block corresponds to a coding mode distinct from the second coding mode, apply at least one processing method to the reconstructed current block,
- when the coding mode of the current block corresponds to the second coding mode, disable the application of said at least one processing method to the reconstructed current block for at least one pixel of said current block.

According to a particular embodiment of the invention, such an encoding device is comprised in a terminal, or a server.

The decoding method, respectively the encoding method, according to the invention can be implemented in various ways, notably in wired form or in software form. According to a particular embodiment of the invention, the decoding method, respectively the encoding method, is implemented by a computer program. The invention also relates to a computer program comprising instructions for implementing the decoding method or the encoding method according to any one of the particular embodiments previously described, when said program is executed by a processor. Such a program can use any programming language. It can be downloaded from a communication network and/or recorded on a computer-readable medium.

This program can use any programming language, and can be in the form of source code, object code, or intermediate code between source code and object code, such as in a partially compiled form, or in any other desirable form.

The invention also relates to a computer-readable storage medium or data medium comprising instructions of a computer program as mentioned above. The recording media mentioned above can be any entity or device able to store the program. For example, the medium can comprise a storage means such as a memory. On the other hand, the recording media can correspond to a transmissible medium such as an electrical or optical signal, that can be carried via an electrical or optical cable, by radio or by other means. The program according to the invention can be downloaded in particular on an Internet-type network.

Alternatively, the recording media can correspond to an integrated circuit in which the program is embedded, the circuit being adapted to execute or to be used in the execution of the method in question.

LIST OF FIGURES

Figure 2:
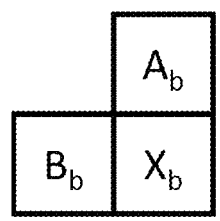
Figure 3:
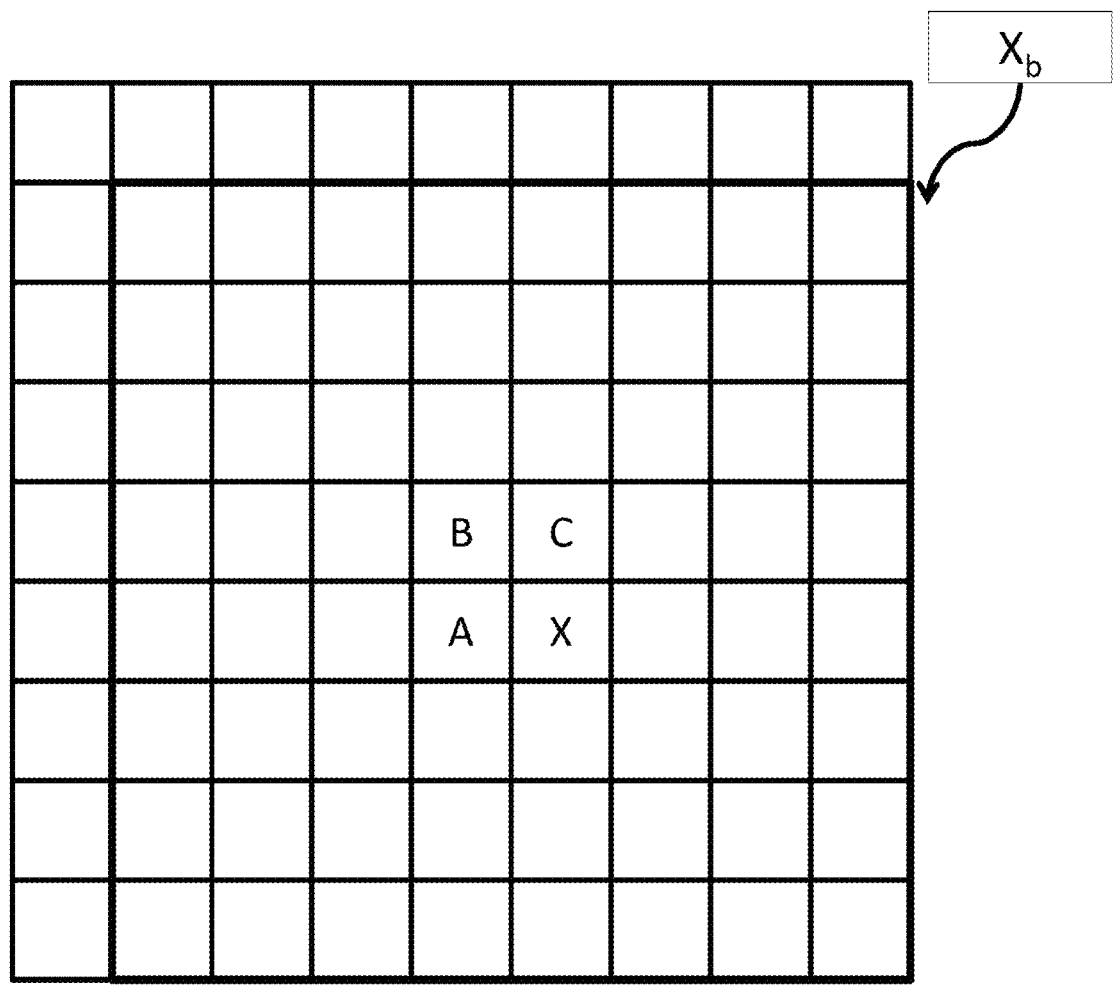
Figure 4:
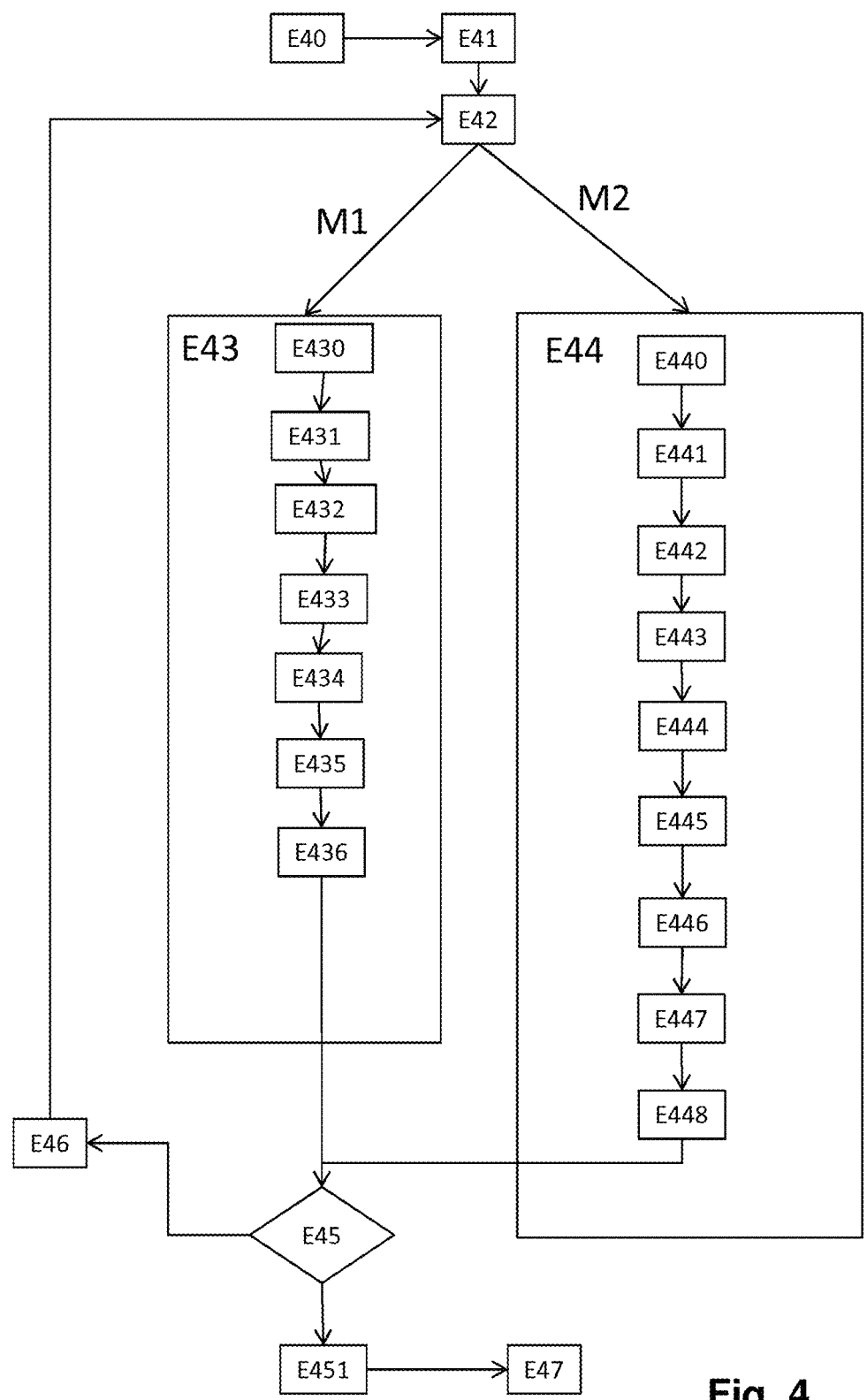

Other characteristics and advantages of the invention will emerge more clearly upon reading the following description of a particular embodiment, provided as a simple illustrative non-restrictive example, and the annexed drawings, wherein:

FIG. 1 shows steps of the coding method according to a particular embodiment of the invention, FIG. 2 illustrates a position example of the neighbouring blocks of a current block to determine an intra prediction mode according to a particular embodiment of the invention, FIG. 3 illustrates a position example of the reference pixels used to predict pixels of a current block according to a particular embodiment of the invention, FIG. 4 shows steps of the decoding method according to a particular embodiment of the invention, FIGS. 5A and 5B illustrate reconstructed blocks of pixels on which a post-processing operation is applied or not to the pixels according to the coding mode of the block to which the pixels belong, according to particular embodiments of the invention, FIG. 6 shows the simplified structure of a coding device adapted to implement the coding method according to any one of the particular embodiments of the invention, FIG. 7 shows the simplified structure of a decoding device adapted to implement the decoding method according to any one of the particular embodiments of the invention.

DESCRIPTION OF AN EMBODIMENT OF THE INVENTION 5.1 General Principle

Processing operations performed after decoding an image, also known as post-processing operations, are integrated to the video coding standards in order to improve the quality of the reconstructed images. For example, such post-processing operations can consist in the application of a deblocking filtering or in a SAO (Sample Adaptive Offset) post-processing operation.

Deblocking filtering allows to erase, after decoding each block, the discontinuity that exists between each block and to which the human eye is very sensitive. On the other hand, the SAO processing operation allows the value of each pixel of a decoded block to be modified individually.

These two post-processing methods have been integrated, for example, in the HEVC compression standard and provide gains in compression and quality.

However, according to the invention, a new coding mode for the blocks of an image, known as ILR (In-Loop Residual) coding, allows to dispense advantageously with these two post-processing methods.

Regarding the effects of discontinuities between blocks, they are mainly due to the coding of the conventional residue in the form of a transform. The basic vectors of the transform being block-wide, they do not allow an individual control of the pixel values along the boundary of the block. However, the ILR coding mode allows the intensity of each pixel to be coded independently of the others. No block effect is therefore observed, and filtering is useless.

Similarly, the SAO processing operation aims to correct the individual value of certain pixels after a conventional coding. Yet, the ILR coding mode that will be described later already allows the value of each pixel to be coded individually. Therefore, no SAO processing operation is required for these pixels.

However, it is necessary that the encoder can choose for each block to be coded between a conventional coding mode and an ILR coding mode in order to optimise the coding cost of the video sequence.

The general principle of the invention is therefore to activate or not the application of a post-processing method to a reconstructed block depending on whether the block was coded/decoded according to the ILR coding mode.

There are several advantages to enabling deblocking and/or SAO processing operations only for the blocks coded by a conventional coding method, i.e. a coding mode other than ILR.

Indeed, this reduces the rate to be transmitted because no syntax element related to the deblocking filter or to the SAO processing operation is transmitted for the blocks coded/decoded according to the ILR coding mode. This also substantially speeds up the decoding, since the blocks coded/decoded according to the ILR coding mode do not need to apply the deblocking and/or SAO processing steps that are quite cumbersome to implement in terms of calculations and memory resources.

5.2 Embodiments

FIG. 1 shows steps of the coding method according to a particular embodiment of the invention. For example, a sequence of images $I_1, I_2, \ldots, I_{Nb}$ is coded in the form of a coded data stream STR according to a particular embodiment of the invention. For example, such a coding method is implemented by a coding device as described later in relation to FIG. 6.

A sequence of images $I_1, I_2, \ldots, I_{Nb}$, Nb being the number of images of the sequence to be coded, is provided as input of the coding method. The coding method outputs a coded data stream STR representative of the sequence of images provided as input.

In a known manner, the coding of the sequence of images $I_1, I_2, \ldots, I_{Nb}$ is done image by image according to a coding order previously established and known to the encoder. For example, the images can be coded in the temporal order $I_1, I_2, \ldots, I_{Nb}$, or in another order, for example $I_1, I_2, \ldots, I_{Nb}$.

In a step E0, an image $I_j$ to be coded of the sequence of images $I_1, I_2, \ldots, I_{Nb}$ is split into blocks, for example into blocks of size 32×32 or 64×64 pixels or more. Such a block can be subdivided into square or rectangular sub-blocks, for example 16×16, 8×8, 4×4, 16×8, 8×16 . . . .

In a step E1, a first block or sub-block $X_b$ to be coded of the image $I_j$ is selected according to a predetermined scanning order of the image $I_j$. For example, it can be the first block in the lexicographical scanning order of the image.

In a step E2, the encoder will choose the coding mode to code the current block $X_b$.

According to the particular embodiment described here, the encoder selects the coding mode to code the current block $X_b$ from a first coding mode M1 and a second coding mode M2. Additional coding modes (not described here) can be used.

According to the particular embodiment described here, the first coding mode M1 corresponds to the coding of the current block by conventional intra prediction, for example as defined according to the HEVC standard, and the second coding mode M2 corresponds to the In-Loop Residual (ILR) prediction coding.

The principle of the invention can be extended to other types of coding modes for the first coding mode M1. For example, the first coding mode can correspond to any type of coding modes using a transform of the prediction residue (inter-image prediction coding, spatial prediction with template matching coding, etc.).

In step E2, the encoder can perform a rate/distortion optimisation to determine the best coding mode to code the current block. During this rate/distortion optimisation, additional coding modes distinct from the first and the second coding modes can be tested, for example an inter mode coding mode. During this rate/distortion optimisation, the encoder simulates the coding of the current block $X_b$ according to the different available coding modes in order to determine the rate and the distortion associated with each coding mode and selects the coding mode offering the best rate/distortion compromise, for example according to the D+λ. R function, where R is the rate required to code the current block according to the evaluated coding mode, D is the distortion measured between the decoded block and the original current block, and λ is a Lagrangian multiplier, for example entered by the user or defined at the encoder.

In a step E20, an item of information indicating the coding mode selected for the current block is coded in the data stream STR.

If the current block $X_b$ is coded according to the first coding mode M1, the method proceeds to step E21 for coding the block according to M1. If the current block $X_b$ is coded according to the second coding mode M2, the method proceeds to step E22 for coding the block according to M2.

Step E21 for coding the block according to the first coding mode M1, according to a particular embodiment of the invention, is described below. According to the particular mode described here, the first coding mode corresponds to a conventional intra prediction, such as the one defined in the HEVC standard.

In a step E210, a quantization step $\delta_1$ is determined. For example, the quantization step $\delta_1$ can be set by the user, or calculated using a quantization parameter setting a compromise between compression and quality and entered by the user or defined by the encoder. Thus, such a quantization parameter can be the parameter $\lambda$, used in the rate-distortion cost function $D+\lambda.R$, where D represents the distortion introduced by the coding and R the rate used for coding. This function is used to make coding choices. Typically, a way of coding the image that minimises this function is sought.

As a variant, the quantization parameter can be QP, corresponding to the quantization parameter conventionally used in the AVC or HEVC standards. Thus, in the HEVC standard, the quantization step $\delta_i$ is determined by the equation $\delta_1$=levelScale[QP%6]<<(QP/6)) where levelScale [k]={40, 45, 51, 57, 64, 72} for k=0.5.

In a step E211, a prediction of the current block is determined using a conventional intra prediction mode. According to this conventional intra prediction, each predicted pixel is calculated only from the decoded pixels originating from the neighbouring blocks (reference pixels) located above the current block, and to the left of the current block. The way the pixels are predicted from the reference pixels depends on a prediction mode that is transmitted to the decoder, and that is chosen by the encoder from a predetermined set of modes known to the encoder and the decoder.

Thus, in HEVC there are 35 possible prediction modes: 33 modes that interpolate the reference pixels in 33 different angular directions, and 2 other modes: the DC mode in which each pixel of the predicted block is produced from the average of the reference pixels, and the PLANAR mode, that performs a planar and non-directional interpolation. This "conventional intra prediction" is well known and also used in the ITU-T H.264 standard (where there are only 9 different modes) as well as in the experimental JEM software available at the Internet address (https://jvet.hhi.fraunhofer.de/), where there are 67 different prediction modes. In all cases, the conventional intra prediction respects the two aspects mentioned above (prediction of the pixels from the neighbouring blocks and transmission to the decoder of an optimal prediction mode).

In step E211, the encoder thus chooses one of the available prediction modes from the predetermined list of prediction modes. One way to choose consists for example in evaluating all the prediction modes and keeping the prediction mode that minimises a cost function such as, classically, the rate-distortion cost.

In a step E212, the prediction mode chosen for the current block is coded from the neighbouring blocks of the current block. FIG. 2 shows a position example of the neighbouring blocks $A_b$ and $B_b$ of the current block $X_b$ to code the prediction mode of the current block $X_b$.

In step E212, the intra prediction mode chosen for the current block is coded using the intra prediction modes associated with the neighbouring blocks.

For example, the approach described in the HEVC standard for coding the prediction mode of the current block can be used. In the example in FIG. 2, such an approach consists in identifying the intra prediction mode $m_A$ associated with the block $A_b$ located above the current block, and the intra prediction mode $m_B$ associated with the block $B_b$ located just to the left of the current block. Depending on the value of $m_A$ and $m_B$, a list called MPM (for Most Probable Mode), containing 3 intra prediction modes, and a list called non-MPM, containing the 32 other prediction modes, are created.

According to the HEVC standard, in order to code the intra prediction mode of the current block, syntax elements are transmitted:
 a binary indicator indicating if the prediction mode to be coded for the current block is in the MPM list or not,
 if the prediction mode of the current block belongs to the MPM list, an index in the MPM list corresponding to the prediction mode of the current block is coded,
 if the prediction mode of the current block does not belong to the MPM list, an index in the non-MPM list corresponding to the prediction mode of the current block is coded.

In a step E213, the prediction residue R for the current block is constructed.

In step E213, in a standard manner, a predicted block P is constructed according to the prediction mode chosen in step E211. Then, the prediction residue R is obtained by calculating the difference for each pixel between the predicted block P and the original current block.

In a step E214, the prediction residue R is transformed into $R_T$.

In step E214, a frequency transform is applied to the residue block R in order to produce the block $R_T$ comprising transform coefficients. The transform could be a DCT-type transform for example. It is possible to choose the transform to be used from a predetermined set of transforms $E_T$ and to inform the decoder of the transform used.

In a step E215, the transformed residue block $R_T$ is quantized using for example a scalar quantization of quantization step $\delta_1$. This produces the quantized transformed prediction residue block $R_{TQ}$.

In a step E216, the coefficients of the quantized block $R_{TQ}$ are coded by an entropy encoder. For example, the entropy coding specified in the HEVC standard can be used.

In a known manner, the current block is decoded by dequantizing the coefficients of the quantized block $R_{TQ}$, then applying the inverse transform to the dequantized coefficients to obtain the decoded prediction residue. The prediction is then added to the decoded prediction residue in order to reconstruct the current block and obtain its decoded version.

The decoded version of the current block can then be used later to spatially predict other neighbouring blocks of the image or to predict blocks of other images by inter-image prediction.

Step E22 for coding the block according to the second coding mode M2, according to a particular embodiment of the invention, is described below. According to the particular embodiment described here, the second coding mode corresponds to an ILR prediction coding.

In a step E220, a local predictor PL for the current block is determined. According to the coding mode described here, the pixels of the current block are predicted by previously reconstructed pixels of a neighbouring block of the current block or of the current block itself.

Preferably, for the prediction, pixels that are as close as possible to the pixel to be predicted are chosen. This is why it is referred to as a local predictor. The local predictor PL can also be assimilated to a prediction mode of the current block associated with the second coding mode M2. According to this interpretation, in the particular embodiment described here, the first coding mode uses a first group of intra prediction modes, for example the intra prediction modes defined by the HEVC standard, and the second coding mode, here the ILR mode, uses a second group of prediction modes distinct from the first group of intra prediction modes.

The local predictor PL can be unique or it can be selected from a set of predetermined local predictors (second group of prediction modes).

According to an embodiment variant, 4 local predictors are defined. Thus, if we call X a current pixel to be predicted from the current block, A the pixel located immediately to the left of X, B the pixel located immediately to the left of and above X, C the pixel located immediately above X, as illustrated in FIG. 3 showing a current block $X_b$, 4 local predictors PL1, PL2, PL3, PL4 can be defined as follows:

PL1(X)=min(A,B) if C≥max(A,B)
max(A,B) if C≤min(A,B)
A+B−C otherwise
PL2(X)=A
PL3(X)=B
PL4(X)=C where min(A,B) corresponds to the function returning the smallest value between the value of A and the value of B and max(A,B) corresponds to the function returning the largest value between the value of A and the value of B.

In step E220, the local predictor PL used for the current block is determined. In other words, the same local predictor will be used for all the pixels of the current block, i.e. the same prediction function. For this purpose, several embodiment variants are possible.

The coding of the current block with each of the predictors can be simulated (similarly to an optimisation to choose a coding mode for the current block), and the local predictor that optimises a cost function (for example, that minimises the D+A.R function, where R is the rate used to code the block, D is the distortion of the decoded block relative to the original block, and A is a parameter set by the user) is selected.

Or, in order to limit the complexity of selecting a local predictor for the current block, an orientation of the texture of the previously coded pixels is analysed. For example, the previously coded pixels in the block that are located above or to the left of the current block are analysed using a Sobel-type operator. If it is determined that:
 the orientation is horizontal, the local predictor PL2 is selected,
 the orientation is vertical, the local predictor PL3 is selected,
 the orientation is diagonal, the local predictor PL4 is selected,
 if no orientation emerges, the local predictor PL1 is selected.

A syntax element is coded in the data stream STR to indicate to the decoder which local predictor was used to predict the current block.

In a step E221, a quantization step $\delta_2$ is determined. For example, the quantization step $\delta_2$ depends on the same quantization parameter as the quantization step $\delta_1$ that would be determined in step E210 if the current block was coded according to the first coding mode.

In a step E222, a prediction residue R1 is calculated for the current block. For this purpose, once the local predictor is chosen, for each current pixel of the current block:
 the current pixel X of the current block is predicted by the selected local predictor PL, using either pixels outside the block and already reconstructed (and thus available with their decoded value), or pixels previously reconstructed in the current block, or both, in order to obtain a predicted value PRED. In all cases, the predictor PL uses previously reconstructed pixels. In FIG. 3, it can be seen that the pixels of the current block located on the first row and/or the first column of the current block will use as reference pixels (to construct the predicted value PRED) pixels outside the block and already reconstructed (pixels in grey in FIG. 3) and possibly already reconstructed pixels of the current block. For the other pixels of the current block, the reference pixels used to construct the predicted value PRED are located inside the current block;
 the difference DIFF between PRED and X is quantized into a value Q(X), by a $\delta_2$ quantization step scalar quantizer, by Q(X)=ScalarQuant(DIFF)=ScalarQuant ($\delta_2$, X-PRED), the scalar quantizer being for example a nearest-neighbour scalar quantizer such as:

$$ScalarQuant(\Delta, x) = \text{floor}\left(\frac{x + \frac{\Delta}{2}}{\Delta}\right).$$

Q(X) is the quantized residue associated with X. It is calculated in the spatial domain, i.e. calculated directly from the difference between the predicted value PRED of the pixel X and the original value of X. Such a quantized residue Q(X) for the pixel X is stored in a quantized prediction residue block $R1_Q$, that will be coded later;
 the decoded predicted value P1(X) of X is calculated by adding to the predicted value PRED the dequantized value of the quantized residue Q(X). The decoded predicted value P1(X) of X is thus obtained by P1(X) =PRED+ScalarDequant($\delta_2$, Q(X)). For example, the nearest scalar quantization inverse function is given by: ScalarDequant($\Delta$, x)=$\Delta \times$x.

The decoded predicted value P1(X) thus makes it possible to predict possible pixels that remain to be processed in the current block. Moreover, the block P1 comprising the decoded/reconstructed values of the pixels of the current block is the ILR predictor of the current block (as opposed to the conventional intra predictor).

The sub-steps described above are performed for all the pixels of the current block, in a scanning order that ensures that the pixels used for the prediction chosen from PL1, . . . , PL4 are available.

According to an embodiment variant, the scanning order of the current block is the lexicographical order, i.e. from left to right, and from top to bottom.

According to another embodiment variant, several scanning orders of the current block can be used, for example:
 the lexicographical order, or
 scanning the first column from top to bottom, then the column just to the right of it, etc., or,
 scanning the diagonals one after the other.

According to this other variant, it is possible to simulate the coding cost associated with each of the scanning orders and to choose the best scanning order for the current block in terms of rate/distortion, then to code for the current block an item of information representative of the chosen scanning order.

At the end of step E222, the quantized residue block $R1_Q$ was determined. This quantized residue block $R1_Q$ must be coded for transmission to the decoder. The predictor P1 of the current block was also determined.

In a step E223, the quantized residue block $R1_Q$ is coded for transmission to the decoder. Any known approach such as the method described in HEVC can be used to code the quantized coefficients of a conventional prediction residue.

According to the particular embodiment of the invention described here, the values of the quantized residue block $R1_Q$ are coded using an entropy encoder from the data stream STR.

According to a particular embodiment of the invention, it is possible to determine and code an additional prediction residue R2 from the ILR predictor obtained for the current block. The coding of an additional prediction residue R2 is, however, optional. It is indeed possible to simply code the current block by its predicted version P1 and the quantized residue $R1_Q$.

In order to code an additional prediction residue R2 for the current block, the following steps are implemented.

In a step E224, the difference R2 between the predictor P1 and the original current block $X_b$ is calculated to form an additional residue R2: $R2=X_b-P1$. The following steps correspond to the conventional coding steps for this residue R2.

In a step E225, the residue R2 is transformed using a frequency transform in order to produce the block of coefficients $R2_T$.

The transform can be a DCT-type transform for example. It is possible to choose the transform to be used from a predetermined set of transforms $E_{T2}$ and to inform the decoder of the transform used. In this case, the set $E_{T2}$ can be different from the set $E_T$, in order to adapt to the particular statistics of the residue R2.

In a step E226, the block of coefficients $R2_T$ is quantized, for example using a quantization step scalar quantization δ. This produces the block $R2_{TQ}$.

The quantization step δ can be set by the user. It can also be calculated using another parameter A setting the compromise between compression and quality and entered by the user or the encoder. For example, the quantization step S can correspond to the quantization step $δ_1$ or be determined similarly to it.

In a step E227, the coefficients of the quantized block $R2_{TQ}$ are then transmitted in a coded manner. For example, the coding specified in the HEVC standard can be used.

In a known manner, the current block is decoded by dequantizing the coefficients of the quantized block $R2_{TQ}$, then applying the inverse transform to the dequantized coefficients to obtain the decoded prediction residue. The prediction P1 is then added to the decoded prediction residue in order to reconstruct the current block and obtain its decoded version $X_{rec}$. The decoded version $X_{rec}$ of the current block can then be used later to spatially predict other neighbouring blocks of the image or to predict blocks of other images by inter-image prediction.

In a step E23, it is checked if the current block is the last block of the image to be processed by the coding method, taking into account the previously defined scanning order. If the current block is not the last block of the image to be processed, in a step E24, the subsequent block of the image to be processed is selected according to the previously defined scanning order of the image and the coding method proceeds to step E2, where the selected block becomes the current block to be processed.

If all the blocks of the image have been coded, the process proceeds to the application of the post-processing methods to be applied to the reconstructed image in a step E231. As discussed above, these post-processing methods can be a deblocking filtering and/or an SAO method. Since the application of the post-processing operations is done similarly at the encoder and the decoder, step E231 will be described later.

After applying at least one post-processing method, the method proceeds to coding (step E25) the next image of the video, if any.

FIG. 4 shows steps of the method for decoding a stream STR of coded data representative of a sequence of images $I_1$, $I_2$, ..., $I_{Nb}$ to be decoded according to a particular embodiment of the invention.

For example, the data stream STR was generated via the coding method shown in relation to FIG. 1. The data stream STR is provided as input to a decoding device DEC, as described in relation to FIG. 7.

The decoding method decodes the stream image by image and each image is decoded block by block.

In a step E40, an image $I_j$ to be decoded is subdivided into blocks. Each block will undergo a decoding operation consisting in a series of steps that are detailed hereafter. Blocks can be the same size or different sizes.

In a step E41, a first block or sub-block $X_b$ to be decoded of the image $I_j$ is selected as the current block according to a predetermined scanning order of the image $I_j$. For example, it can be the first block in the lexicographical scanning order of the image.

In a step E42, an item of information indicating a coding mode for the current block is read from the data stream STR. According to the particular embodiment described here, this item of information indicates if the current block is coded according to a first coding mode M1 or according to a second coding mode M2. According to the particular embodiment described here, the first coding mode M1 corresponds to the conventional intra prediction coding of the current block, for example as defined according to the HEVC standard, and the second coding mode M2 corresponds to the In-Loop Residual (ILR) prediction coding.

In other particular embodiments, the item of information read from the stream STR can also indicate the use of other coding modes to code the current block (not described here).

The step E43 for decoding the current block when the current block is coded according to the first coding mode M1 is described below.

In a step E430, a quantization step $δ_1$ is determined. For example, the quantization step $δ_1$ is determined from the quantization parameter QP read in step E401 or similarly to what was done at the encoder. For example, the quantization step $δ_1$ can be calculated using the quantization parameter QP read in step E401. For example, the quantization parameter QP can be the quantization parameter conventionally used in the AVC or HEVC standards. Thus, in the HEVC standard, the quantization step $δ_1$ is determined by the equation $δ_1$=levelScale[QP%6]<<(QP/6)) where levelScale [k]={40, 45, 51, 57, 64, 72} for k=0.5.

In a step E431, the prediction mode chosen to code the current block is decoded from the neighbouring blocks. For this purpose, as it was done at the encoder, the intra prediction mode chosen for the current block is coded using the intra prediction modes associated with the neighbouring blocks of the current block.

The construction of both MPM and non-MPM lists is strictly similar to what was done during coding. According to the HEVC standard, syntax elements of the following type are decoded:
- a binary indicator indicating if the prediction mode to be coded for the current block is in the MPM list or not,
- if the prediction mode of the current block belongs to the MPM list, an index in the MPM list corresponding to the prediction mode of the coded current block,
- if the prediction mode of the current block does not belong to the MPM list, an index in the non-MPM list corresponding to the prediction mode of the coded current block.

The binary indicator and the prediction mode index are thus read for the current block from the data stream STR, to decode the intra prediction mode of the current block.

In a step E432, the decoder constructs a predicted block P for the current block from the decoded prediction mode.

In a step E433, the decoder decodes the coefficients of the quantized block $R_{TQ}$ from the data stream STR, for example using the decoding specified in the HEVC standard.

In a step E434, the decoded block $R_{TQ}$ is dequantized, for example using a $\delta_1$ quantization step scalar dequantization. This produces the block of dequantized coefficients $R_{TQD}$.

In a step E435, an inverse frequency transform is applied to the block of dequantized coefficients $R_{TQD}$ in order to produce the decoded prediction residue block $R_{TQDI}$. The transform could be an inverse DCT-type transform for example. It is possible to choose the transform to be used from a predetermined set of transforms ETI by decoding an indicator from the data stream STR.

In a step E436, the current block is reconstructed from the predicted block P obtained in step E432 and the decoded residue block $R_{TQDI}$ obtained in step E435, in order to produce the decoded current block $X_{rec}$, by $X_{rec}=P+R_{TQDI}$.

The step E44 for decoding the current block when the current block is coded according to the second coding mode M2 is described below.

In a step E440, the local predictor PL used to predict the pixels of the current block is determined. In the case where only one predictor is available, the local predictor is, for example, set by default at the decoder level and no syntax element needs to be read from the stream STR to determine it.

In the case where several local predictors are available, for example the predictors PL1-PL4 described above, a syntax element is decoded from the data stream STR to identify which local predictor was used to predict the current block. The local predictor is thus determined from that decoded syntax element.

In a step E441, the quantization step $\delta_2$ is determined, similarly to what was done at the encoder.

In a step E442, the quantized residue $R1_Q$ is decoded from the data stream STR. Any known approach such as the method described in HEVC can be used to decode the quantized coefficients of the conventional prediction residue.

In a step E443, the quantized residue block $R1_Q$ is dequantized using the quantization step $\delta_2$, in order to produce the dequantized residue block $R1_{QD}$.

In a step E444, when the dequantized residue block $R1_{QD}$ is obtained, the predicted block P1 is constructed using the local predictor PL determined in step E440.

In step E444, each pixel of the current block is predicted and reconstructed as follows:
- the current pixel X of the current block is predicted by the selected predictor PL, using either pixels outside the block and already reconstructed, or previously reconstructed pixels of the current block, or both, in order to obtain a predicted value PRED. In all cases, the predictor PL uses previously decoded pixels;
- the decoded predicted value P1(X) of the current pixel X is calculated by adding to the predicted value PRED the dequantized value of the prediction residue $R1_{QD}$, such that $P1(X)=PRED+R1_{QD}(X)$.

These steps are implemented for all the pixels of the current block, in a scanning order that ensures that the pixels used for the prediction chosen from PL1, . . . , PL4 are available.

For example, the scanning order is the lexicographical order (from left to right, then rows from top to bottom).

According to a particular embodiment of the invention, the predicted block P1 comprising the decoded predicted values P1(X) of each pixel of the current block forms here the decoded current block $X_{rec}$.

According to another particular embodiment of the invention, it is considered here that an additional prediction residue was coded for the current block. It is therefore necessary to decode this additional prediction residue in order to reconstruct the decoded version of the current block $X_{rec}$.

For example, this other particular embodiment can be activated or not by default at the encoder and decoder level. Or, an indicator can be coded in the data stream with the block level information to indicate for each block coded according to the ILR coding mode if an additional prediction residue is coded. Or further, an indicator can be coded in the data stream with the image or sequence of images level information to indicate for all the blocks of the image or of the sequence of images coded according to the ILR coding mode if an additional prediction residue is coded.

When an additional prediction residue is coded for the current block, in a step E445, the coefficients of the quantized prediction residue $R2_{TQ}$ are decoded from the data stream STR, using means adapted to those implemented at the encoder, for example the means implemented in an HEVC decoder.

In a step E446, the block of quantized coefficients $R2_{TQ}$ is dequantized, for example using a scalar dequantization of quantization step $\delta_1$. This produces the block of dequantized coefficients $R2_{TQD}$.

In a step E447, an inverse frequency transform is applied to the block $R2_{TQD}$ in order to produce the decoded prediction residue block $R2_{TQDI}$.

The inverse transform could be an inverse DCT-type transform for example.

It is possible to choose the transform to be used from a predetermined set of transforms $E_{T2}$ and to decode the item of information informing the decoder of the transform to be used. In this case, the set $E_{T2}$ is different from the set $E_T$, in order to adapt to the particular statistics of the residue R2.

In a step E448, the current block is reconstructed by adding the predicted block P1 obtained in step E444 to the decoded prediction residue $R2_{TQDI}$.

In a step E45, it is checked if the current block is the last block of the image to be processed by the decoding method, taking into account the previously defined scanning order. If the current block is not the last block of the image to be processed, in a step E46, the subsequent block of the image to be processed is selected according to the previously defined scanning order of the image and the decoding method proceeds to step E42, the selected block becoming the current block to be processed.

If all the blocks of the image have been decoded, the process proceeds to the application of at least one post-processing method to be applied to the reconstructed image in a step E451.

As discussed above, these post-processing methods can be a deblocking filtering and/or an SAO method.

After applying at least one post-processing method, the method proceeds to decoding (step E47) the next image of the video, if any.

Steps E231 and E451 for applying at least one post-processing method at the encoder and the decoder respectively according to the invention are described below.

Post-processing operations generally require an access to the data contained in the neighbouring blocks of a current block to be processed, including the "future" or not yet reconstructed blocks, according to the scanning order of the blocks in the image used at the encoder and the decoder. Post-processing operations are therefore generally performed by making a second complete loop on all the reconstructed blocks of the image. Thus, at the encoder and the decoder, a first loop on all the blocks of the image constructs a reconstructed version of the blocks from the coded information for the blocks, then a post-processing loop runs through the reconstructed blocks again to improve their reconstruction.

Two enhancement examples are given above, the general principle of the invention applying of course to other post-processing methods.

Deblocking Filtering

During this processing operation, a "deblocking" filtering is applied to reconstructed blocks of the image. This filtering generally consists in applying a low-pass filter to the pixels that are at the boundary of a reconstructed block. Such a filter is described in general terms in the article Andrey Norkin et al, "*HEVC deblocking filter*", IEEE Transactions on Circuits and Systems for Video Technology (Volume: 22, Issue: 12, December 2012), page(s): 1746-1754, 5 Oct. 2012.

According to a particular embodiment of the invention, the deblocking filtering is applied only at the boundary of two reconstructed blocks that were previously coded by a conventional coding mode, i.e. other than ILR.

This particular embodiment of the invention is, for example, illustrated in FIG. 5A showing:
- a reconstructed block of pixels 80 that was decoded according to the coding mode M2 (ILR),
- a reconstructed block of pixel 81 that was decoded according to a coding mode M1 (non-ILR), neighbouring the block 80,
- a reconstructed block of pixels 82 that was decoded according to a coding mode M1 (non-ILR), neighbouring the block 81.

In FIG. 5A:
the hatched pixels correspond to the pixels for which the application of the deblocking filtering is disabled,
the pixels filled with dots are pixels that, due to their location in the reconstructed block, are not concerned by the deblocking filtering,
and the white pixels are the pixels to which the deblocking filtering is applied.

Thus, according to the particular embodiment of the invention described, when the current block, for example the block 80, is decoded or coded according to the coding mode M2, the application of the deblocking filtering to the reconstructed current block is disabled for all the pixels of the current block. This is shown in FIG. 5A, where all the pixels at the boundary of the block 80 are hatched.

Moreover, when the current block, for example the block 81, is decoded or coded according to a conventional or non-ILR coding mode, the deblocking filtering is applied to a pixel of the reconstructed current block if the pixel is located on a boundary of the reconstructed current block with a neighbouring block and if the neighbouring block was decoded or coded according to a conventional, i.e. non-ILR, coding mode. This is shown in FIG. 5A, where all the pixels of the block 81 located at the boundary with the block 80 are hatched and all the pixels of the block 81 located at the boundary with the block 82 are white.

According to a particular embodiment of the invention, the deblocking filtering is only applied at the boundary of two blocks of which at least one of the two blocks is a block coded/decoded according to a conventional coding mode (for example M1 in the example described in relation to FIGS. 2 and 4).

This particular embodiment of the invention is, for example, illustrated in FIG. 5B showing:
- a reconstructed block of pixels 83 that was decoded according to the coding mode M1 (non-ILR),
- a reconstructed block of pixels 84 that was decoded according to a coding mode M2 (ILR), neighbouring the block 83,
- a reconstructed block of pixels 85 that was decoded according to a coding mode M2 (ILR), neighbouring the block 84.

In FIG. 5B:
the hatched pixels correspond to the pixels for which the application of the deblocking filtering is disabled,
the pixels filled with dots are pixels that, due to their location in the block, are not concerned by the deblocking filtering,
the white pixels are the pixels to which the deblocking filtering is applied.

Thus, according to the particular embodiment of the invention described, when the current block, for example the block 84, was decoded or coded according to the coding mode M2 (ILR), the application of the deblocking filtering is disabled for a pixel of the reconstructed current block 84 if the pixel is located on a boundary of the reconstructed current block 84 with a neighbouring block and if said neighbouring block was decoded or coded according to the coding mode M2 (ILR). This is shown in FIG. 5B, where all the pixels of the block 84 located at the boundary with the block 85 are hatched.

Moreover, according to this particular embodiment of the invention, the deblocking filtering is applied to a pixel of the reconstructed current block (84) if the pixel is located on a boundary of the reconstructed current block with a neighbouring block and if the neighbouring block was decoded or coded according to a coding mode distinct from the coding mode M2. This is shown in FIG. 5B, where all the pixels of the block 84 located at the boundary with the block 83 are white.

SAO Processing Operation

Typically, the SAO processing operation is applied to all the pixels of a reconstructed block.

Such an SAO processing operation consists in shifting the decoded value of each pixel of the block by a value explicitly transmitted to the decoder, depending on the environment of said pixel. The SAO processing operation is described in Chih-Ming Fu, Elena Alshina, Alexander Alshin, Yu-Wen Huang, Ching-Yeh Chen, and Chia-Yang Tsai, Chih-Wei Hsu, Shaw-Min Lei, Jeong-Hoon Park, and Woo-Jin Han, "*Sample Adaptive Offset in the HEVC Stan-* dard" IEEE TRANSACTIONS ON CIRCUITS AND SYSTEMS FOR VIDEO TECHNOLOGY, VOL. 22, No. 12, DECEMBER 2012, 1755.

According to a particular embodiment of the invention, the SAO processing operation is applied only on the reconstructed blocks that were coded by a conventional, i.e. non-ILR, coding mode. In other words, when the current block is decoded or coded according to the ILR coding mode (M2 in the examples previously described), the application of the SAO method to the reconstructed current block is disabled for all the pixels of the reconstructed current block.

FIG. 6 shows the simplified structure of a coding device COD adapted to implement the coding method according to any one of the particular embodiments of the invention.

According to a particular embodiment of the invention, the steps of the coding method are implemented by computer program instructions. For this purpose, the coding device COD has the standard architecture of a computer and notably comprises a memory MEM, a processing unit UT, equipped for example with a processor PROC, and driven by the computer program PG stored in the memory MEM. The computer program PG comprises instructions for implementing the steps of the coding method as described above, when the program is executed by the processor PROC.

At initialisation, the code instructions of the computer program PG are for example loaded into a RAM memory (not shown) before being executed by the processor PROC. In particular, the processor PROC of the processing unit UT implements the steps of the coding method described above, according to the instructions of the computer program PG.

FIG. 7 shows the simplified structure of a decoding device DEC adapted to implement the decoding method according to any one of the particular embodiments of the invention.

According to a particular embodiment of the invention, the decoding device DEC has the standard architecture of a computer and notably comprises a memory MEM0, a processing unit UT0, equipped for example with a processor PROC0, and driven by the computer program PG0 stored in the memory MEM0. The computer program PG0 comprises instructions for implementing the steps of the decoding method as described above, when the program is executed by the processor PROC0.

At initialisation, the code instructions of the computer program PG0 are for example loaded into a RAM memory (not shown) before being executed by the processor PROC0. In particular, the processor PROC0 of the processing unit UT0 implements the steps of the decoding method described above, according to the instructions of the computer program PG0.

What is claimed is:

1. A method for decoding a coded data stream representative of at least one image, said image being split into blocks, wherein the method comprises the following acts implemented by a decoding device for at least one block of the image, referred to as the current block:
    decoding an item of information indicating a coding mode of the current block among at least a first coding mode and a second coding mode, the second coding mode being a coding mode according to which the current block is not decoded by using an inverse transform of a transformed prediction residue of the current block, but by, for each pixel of the current block:
        obtaining a prediction of said pixel from another previously decoded pixel, said other previously decoded pixel belonging to said current block or to a previously decoded block of the image,
        decoding a prediction residue associated with said pixel, and
        reconstructing said pixel from the prediction of said pixel obtained and the decoded prediction residue associated with said pixel,
    decoding the current block according to the coding mode indicated by the decoded item of information,
    when the coding mode of the current block corresponds to a coding mode distinct from the second coding mode, applying at least one processing method to the reconstructed current block, and
    when the coding mode of the current block corresponds to the second coding mode:
        disabling applying said at least one processing method to the reconstructed current block for a pixel of the reconstructed current block if said pixel is located on a boundary of said reconstructed current block with a neighbouring block in the image and if said neighbouring block is decoded according to the second coding mode, and
        applying said at least one processing method to a pixel of the reconstructed current block if said pixel is located on a boundary of said reconstructed current block with a reconstructed neighbouring block in the image and if said neighbouring block is decoded according to a coding mode distinct from the second coding mode.

2. The method according to claim 1, wherein said processing method comprises a deblocking filtering.

3. The method according to claim 2, wherein:
    when the current block is decoded according to a coding mode distinct from the second coding mode:
        the deblocking filtering is applied to a pixel of the reconstructed current block if said pixel is located on a boundary of said reconstructed current block with a neighbouring reconstructed block in the image and if said neighbouring block is decoded according to a coding mode distinct from the second coding mode.

4. The method according to claim 1, wherein when the coding mode of the current block corresponds to a coding mode distinct from the second coding mode, said processing method comprises a method for correcting at least one pixel of the reconstructed current block by adding to the reconstructed value of said pixel a value obtained from an item of information decoded from the data stream.

5. The method according to claim 4, wherein, when the current block is decoded according to the second coding mode, the application of said method for correcting to the reconstructed current block is disabled for all the pixels of the reconstructed current block.

6. A method for encoding a data stream representative of at least one image, said image being split into blocks, wherein the method comprises the following acts implemented by a coding device for at least one block of the image, referred to as the current block:
    coding an item of information indicating a coding mode of the current block among at least a first coding mode and a second coding mode, the second coding mode being a coding mode according to which the current block is not coded by using a transform of a prediction residue of the current block, but by, for each pixel of the current block:
        obtaining a prediction of said pixel from another previously decoded pixel, said other previously decoded pixel belonging to said current block or to a previously decoded block of the image, coding a prediction residue associated with said pixel obtained from the prediction of said pixel, and reconstructing said pixel from the decoded prediction residue associated with said pixel and the prediction of said pixel, coding the current block according to the coding mode indicated by the coded item of information, when the coding mode of the current block corresponds to a coding mode distinct from the second coding mode, applying at least one processing method to the reconstructed current block, and when the coding mode of the current block corresponds to the second coding mode:

disabling applying said at least one processing method to the reconstructed current block for a pixel of the reconstructed current block if said pixel is located on a boundary of said reconstructed current block with a neighbouring block in the image and if said neighbouring block is coded according to the second coding mode, and applying said at least one processing method to a pixel of the reconstructed current block if said pixel is located on a boundary of said reconstructed current block with a reconstructed neighbouring block in the image and if said neighbouring block is coded according to a coding mode distinct from the second coding mode.

7. The method according to claim 6, wherein said processing method comprises a deblocking filtering.

8. The method according to claim 7, wherein:

when the current block is coded according to a coding mode distinct from the second coding mode:

the deblocking filtering is applied to a pixel of the reconstructed current block if said pixel is located on a boundary of said reconstructed current block with a neighbouring reconstructed block in the image and if said neighbouring block is coded according to a coding mode distinct from the second coding mode.

9. The method according to claim 6, wherein when the coding mode of the current block corresponds to a coding mode distinct from the second coding mode, said processing method is a method for correcting at least one pixel of the reconstructed current block by adding to the reconstructed value of said pixel a value obtained from an item of information encoded in the data stream.

10. The method according to claim 9, wherein, when the current block is encoded according to the second coding mode, the application of said correction method to the reconstructed current block is disabled for all the pixels of the reconstructed current block.

11. A decoding device for decoding an encoded data stream representative of at least one image, said image being split into blocks, wherein the decoding device comprises a processor configured, for at least one block of the image, referred to as the current block, to:

decode an item of information indicating a coding mode of the current block among at least a first coding mode and a second coding mode, the second coding mode being a coding mode according to which the current block is not decoded by using an inverse transform of a transformed prediction residue of the current block, but by, for each pixel of the current block:

obtaining a prediction of said pixel from another previously decoded pixel, said other previously decoded pixel belonging to said current block or to a previously decoded block of the image, decoding a prediction residue associated with said pixel, and reconstructing said pixel from the prediction of said pixel obtained and the decoded prediction residue associated with said pixel, decode the current block according to the coding mode indicated by the decoded item of information, when the coding mode of the current block corresponds to a coding mode distinct from the second coding mode, apply at least one processing method to the reconstructed current block, and when the coding mode of the current block corresponds to the second coding mode:

disable applying said at least one processing method to the reconstructed current block for a pixel of the reconstructed current block if said pixel is located on a boundary of said reconstructed current block with a neighbouring block in the image and if said neighbouring block is coded according to the second coding mode, and apply said at least one processing method to a pixel of the reconstructed current block if said pixel is located on a boundary of said reconstructed current block with a reconstructed neighbouring block in the image and if said neighbouring block is coded according to a coding mode distinct from the second coding mode.

12. The decoding device according to claim 11, wherein said processing method comprises a deblocking filtering.

13. The decoding device according to claim 12, wherein:

when the current block is decoded according to a coding mode distinct from the second coding mode:

the deblocking filtering is applied to a pixel of the reconstructed current block if said pixel is located on a boundary of said reconstructed current block with a neighbouring reconstructed block in the image and if said neighbouring block is decoded according to a coding mode distinct from the second coding mode.

14. The decoding device according to claim 11, wherein when the coding mode of the current block corresponds to a coding mode distinct from the second coding mode, said processing method comprises a method for correcting at least one pixel of the reconstructed current block by adding to the reconstructed value of said pixel a value obtained from an item of information decoded from the data stream.

15. The decoding device according to claim 14, wherein, when the current block is decoded according to the second coding mode, the application of said method for correcting to the reconstructed current block is disabled for all the pixels of the reconstructed current block.

16. An encoding device for encoding a data stream representative of at least one image, said image being split into blocks, wherein the encoding device comprises a processor configured, for at least one block of the image, referred to as the current block, to:

code an item of information indicating a coding mode of the current block among at least a first coding mode and a second coding mode, the second coding mode being a coding mode according to which the current block is not coded by using a transform of a prediction residue of the current block, but by, for each pixel of the current block:

obtaining a prediction of said pixel from another previously decoded pixel, said other previously decoded pixel belonging to said current block or to a previously decoded block of the image, coding a prediction residue associated with said pixel obtained from the prediction of said pixel, and reconstructing said pixel from the decoded prediction residue associated with said pixel and the prediction of said pixel, code the current block according to the coding mode indicated by the coded item of information, when the coding mode of the current block corresponds to a coding mode distinct from the second coding mode, apply at least one processing method to the reconstructed current block, and when the coding mode of the current block corresponds to the second coding mode:

disable applying said at least one processing method to the reconstructed current block for a pixel of the reconstructed current block if said pixel is located on a boundary of said reconstructed current block with a neighbouring block in the image and if said neighbouring block is coded according to the second coding mode, and apply said at least one processing method to a pixel of the reconstructed current block if said pixel is located on a boundary of said reconstructed current block with a reconstructed neighbouring block in the image and if said neighbouring block is coded according to a coding mode distinct from the second coding mode.

17. A non-transitory computer-readable medium comprising instructions stored thereon for implementing a decoding method for decoding a coded data stream representative of at least one image, when said instructions are executed by a processor of a decoding device, said image being split into blocks, wherein the instructions configure the decoding device to implement the following acts for at least one block of the image, referred to as the current block:

decoding an item of information indicating a coding mode of the current block among at least a first coding mode and a second coding mode, the second coding mode being a coding mode according to which the current block is not decoded by using an inverse transform of a transformed prediction residue of the current block, but by, for each pixel of the current block:

obtaining a prediction of said pixel from another previously decoded pixel, said other previously decoded pixel belonging to said current block or to a previously decoded block of the image, decoding a prediction residue associated with said pixel, and reconstructing said pixel from the prediction of said pixel obtained and the decoded prediction residue associated with said pixel, decoding the current block according to the coding mode indicated by the decoded item of information, when the coding mode of the current block corresponds to a coding mode distinct from the second coding mode, applying at least one processing method to the reconstructed current block, and when the coding mode of the current block corresponds to the second coding mode:

disabling applying said at least one processing method to the reconstructed current block for a pixel of the reconstructed current block if said pixel is located on a boundary of said reconstructed current block with a neighbouring block in the image and if said neighbouring block is coded according to the second coding mode, and applying said at least one processing method to a pixel of the reconstructed current block if said pixel is located on a boundary of said reconstructed current block with a reconstructed neighbouring block in the image and if said neighbouring block is coded according to a coding mode distinct from the second coding mode.

18. A non-transitory computer-readable medium comprising instructions stored thereon for implementing a coding method for encoding a coded data stream representative of at least one image, when said instructions are executed by a processor of a coding device, said image being split into blocks, wherein the instructions configure the coding device to implement the following acts for at least one block of the image, referred to as the current block:

coding an item of information indicating a coding mode of the current block among at least a first coding mode and a second coding mode, the second coding mode being a coding mode according to which the current block is not coded by using a transform of a prediction residue of the current block, but by, for each pixel of the current block:

obtaining a prediction of said pixel from another previously decoded pixel, said other previously decoded pixel belonging to said current block or to a previously decoded block of the image, coding a prediction residue associated with said pixel obtained from the prediction of said pixel, and reconstructing said pixel from the decoded prediction residue associated with said pixel and the prediction of said pixel, coding the current block according to the coding mode indicated by the coded item of information, when the coding mode of the current block corresponds to a coding mode distinct from the second coding mode, applying at least one processing method to the reconstructed current block, and when the coding mode of the current block corresponds to the second coding mode:

disabling applying said at least one processing method to the reconstructed current block for a pixel of the reconstructed current block if said pixel is located on a boundary of said reconstructed current block with a neighbouring block in the image and if said neighbouring block is coded according to the second coding mode, and applying said at least one processing method to a pixel of the reconstructed current block if said pixel is located on a boundary of said reconstructed current block with a reconstructed neighbouring block in the image and if said neighbouring block is coded according to a coding mode distinct from the second coding mode.

* * * * *